United States Patent

[11] 3,599,412

[72] Inventors Alain P. Lefeuvre
Perrigny lez Dijon;
Daniel M. Fournet, Chenove, both of,
France
[21] Appl. No. 819,379
[22] Filed Apr. 25, 1969
[45] Patented Aug. 17, 1971
[73] Assignee Sperry Rand France S.A.
Les Dijon, France
[32] Priority May 6, 1968
[33] France
[31] 150654

[54] FLAIL SHREDDER
13 Claims, 9 Drawing Figs.

[52] U.S. Cl. ........................................... 56/505
[51] Int. Cl. ........................................... A01d 49/00
[50] Field of Search ................................ 56/294 XR, 505

[56] References Cited
UNITED STATES PATENTS
3,452,823  7/1969  Shapland ............ 56/294 X
FOREIGN PATENTS
241,699  11/1962  Australia ............ 56/294

Primary Examiner—Robert Peshock
Attorneys—Joseph A. Brown, John C. Thompson, James J. Kennedy and George C. Bower

ABSTRACT: A crop cutting and shredding machine comprising a plurality of axially spaced flail elements having V-shaped notches forming a pair of reversible cutting edges and a plurality of axially spaced U shaped stationary comb members having spaced, notched cutting edges, the flail cutting edges and the comb cutting edges cooperating to form a closing quadrilateral as the flail rotates to cut and shred crop material therebetween.

INVENTORS
ALAIN P. LEFEUVRE
DANIEL M. FOURNET
ATTORNEY

INVENTORS
ALAIN P. LEFEUVRE
DANIEL M. FOURNET
ATTORNEY

FLAIL SHREDDER

BACKGROUND OF THE INVENTION

This application claims priority from French application Ser. No. P.V. 150,654, filed May 6, 1968.

As a rule, chaff-cutters and like machines for breaking and cutting straw comprise a drum rotatable about a horizontal axis extending at right angles to the longitudinal axis of a frame supported by a train of wheels and adjustable at different optional levels; in these known machines the drum carries either pivotally mounted blades of which the edges approach in succession fixed cutter bars, or fixed, or pivoting radial flails adapted to cut the straw between their radial edges and those of a fixed countercomb.

In the first case the cutting edges of the blades and bars are subjected to a relatively rapid wear and require frequent adjustments and replacements.

In the second instance the straw tends to accumulate between the ends of the flails and the root of the combs, due to the centrifugal force developed during the operation of the machine, and the desired cutting action is impaired when the wear of said flails and combs becomes appreciable.

SUMMARY OF THE INVENTION

It is therefore the object of the present invention to improve machines for breaking and cutting chaff, straw, stems, canes and like fibrous materials for avoiding the inconveniences set forth hereinabove.

To this end, the machine according to the present invention comprises a member adapted to exert a vertical downward compressive force against the straw and crop, with a view to regularize the input of the material to be broken; this compression is obtained by inclining the leading surface of the the front end of the rotor case, the front inclined surface of this case being adapted to bend the straw towards the zone of action of said flails.

Disposed to the rear of the inclined surface of the front member are cooperating flails and countercombs. The flails consist of radially mounted detachable blades carried by the rotor, and their profile is symmetrical in relation to their median radius and constitutes on either side a sharp-edged, V-shaped and wide-angle notch, the vertices of the pair of V-shaped profile portions registering with each other. The outermost angles of these V-shaped notches are interconnected by an edge tangent to the rotational circle. Therefore, these flails are reversible and their profile causes the chaff and straw blades to be gradually urged towards the center of the V.

These flails coact with a countercomb of U-sectional component elements or teeth secured to the inner front face of the rotor case and lie in planes disposed between the planes containing said flails. These U-sectioned elements are notched laterally along a first inclined line extending from the base of the U-section upwards and connected by a curved portion to a second but downwardly inclined line, as will be seen presently. The purpose of the curved connecting portion is to retain as much as possible the material to be cut which is raised by the V-shaped notches of said flails as the latter move between the teeth of the countercombs during their rotational movement.

With this arrangement, as the flails approach the straw stems previously flattened and gathered by the bending action exerted by the shoelike front end of the rotor case which forces said stems towards the bottom of the flail notches, the material to be cut is assembled to form a substantially rectangular-sectioned body shaped by the V notches of said flails in conjunction with the V-shaped but opposite notches of the side faces of the companion countercomb teeth, so that this body lends itself more readily to a cutting action, even when the cutting edges of the sides or ends of the flails and the tooth edges of the countercomb are worn to a considerable degree.

The cut material is expelled from the rear end of the apparatus. The amplitude of the straw spreading action is adjustable by means of lateral and vertical deflector baffles.

BRIEF DESCRIPTION OF THE DRAWING

The invention will now be described more in detail with reference to the diagrammatic drawing attached hereto and illustrating a typical form of embodiment of the invention.

In the drawing:

FIG. 5 is a perspective view showing a double tooth of the countercomb of which.

DESCRIPTION OF THE PREFERRED EMBODIMENT

Figure 1:
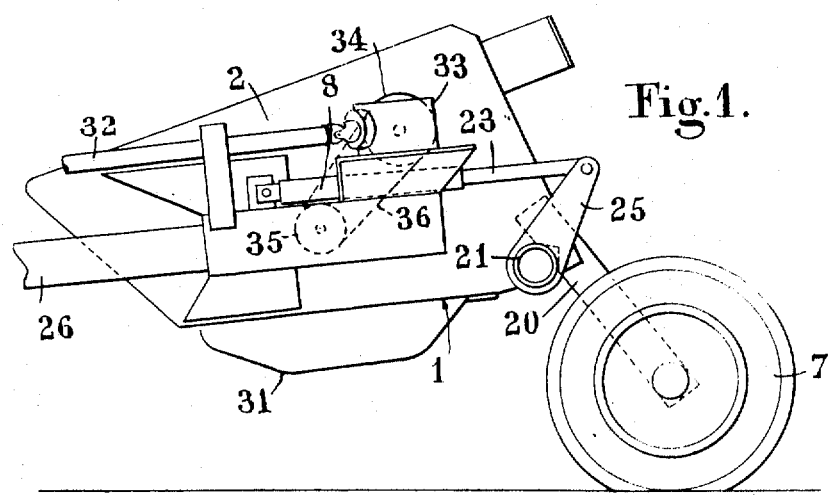
FIG. 1 is a side elevational view of the machine in its uppermost position.

This machine comprises essentially a frame structure 1 having lateral plates 2 and 3 provided with bearings 4 for rotatably mounting the shaft 5 of the rotor. These lateral plates 2 and 3 are connected at their front portions by a triangular-sectioned beam 6.

Figure 2:
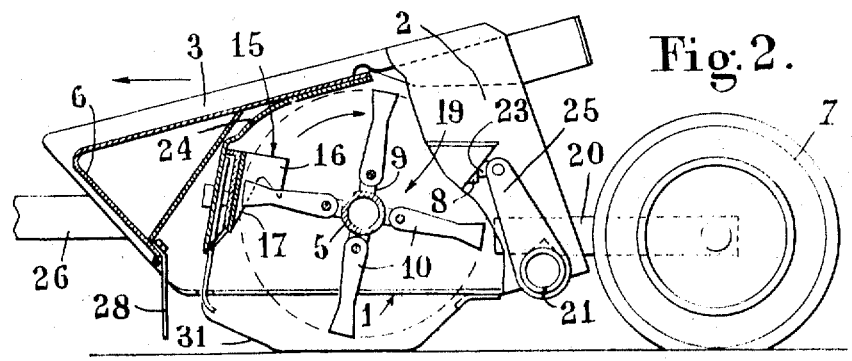
FIG. 2 is a part-sectional and elevational view showing the machine during its actual operation.
Figure 4:
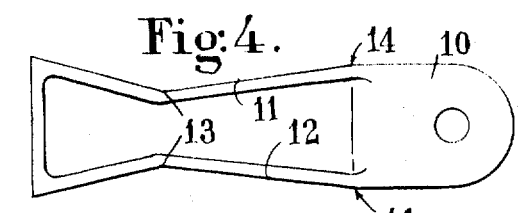
FIG. 4 is a detail view showing on a larger scale a flail.
Figure 5:
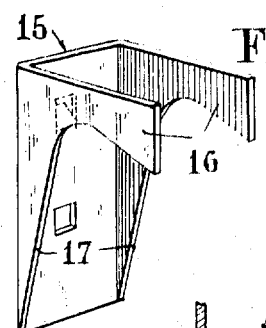

The frame structure 1 is supported by wheels 7 through the medium of wheel carrier arms 20 rigid with a transverse shaft 21 mounted in bearings 22 of plates 2 and 3 and adapted to be rotated by means of a pair of lever arms 25 controlled in turn by means of the piston rod 23 of a fluid-actuated cylinder 8, whereby the wheels 7 can be set either in an inoperative or transport position (FIG. 1) or in an operative position (FIG. 2).

At the front portion of case 24 enclosing the motor 5 the triangular-sectioned beam 6 secured to the lateral plates 2 and 3 of the frame structure is adapted, during the operation of the machine, to bend the material to be cut towards the zone of action of the flails.

The beam 6 is adapted to carry a rubber flap 28 for protecting against stone projections.

Each flail 10 consists of a blade having a contour comprising two inverted-V lateral portions 11 and 12 of which the vertices 13 register with each other, as shown. It is mounted by means of straps 9 and adapted to pivot freely thereon, each strap 9 being on the other hand solid with the rotor shaft 5.

The edges 11 or 12 of the end portion 14 constitute the cutting edges adapted to coact with the countercomb teeth 15.

These countercomb teeth consist in turn and preferably of U-sectioned elements wherein the side members of the U are hollowed along a curved line 17 adapted to form in conjunction with the cutting edges 11 or 12 of flail 10 a quadrilateral closed as the flail rotates, thus cutting and breaking the straw or chaff along the contour of this quadrilateral, irrespective of the degree of wear of the flail edges and of the countercomb edges. These countercomb teeth 15 are removably secured to a transverse support 18. This assembly constitutes the stationary countercomb proper, which is secured in turn to the case 24.

Figure 3:
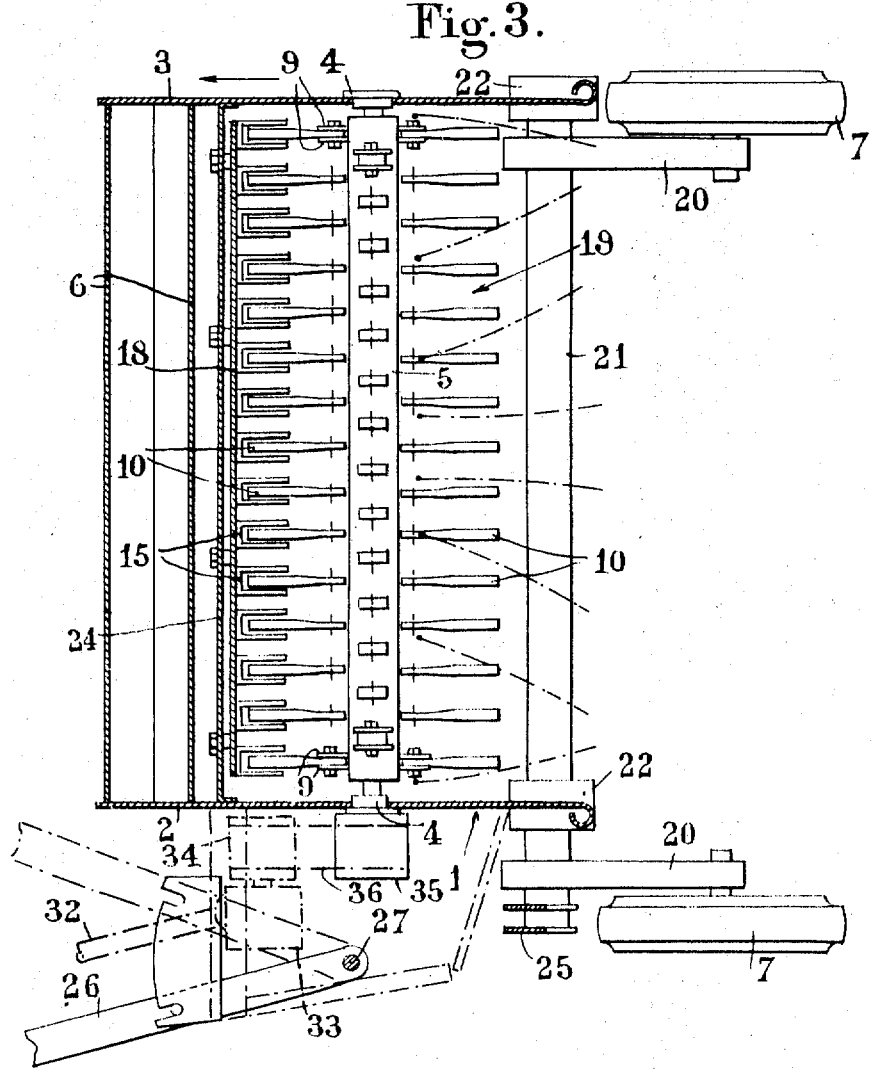
FIG. 3 is a longitudinal section taken along the rotor axis.

This wheel-mounted frame structure, adapted to be set at an adjustable height above the ground is pulled by means of an oscillating pole 26 pivoted on a pin 27 disposed laterally with respect to the machine and attached to a tractor. When the machine is operated, the pole 26 is inclined to its position shown in thick lines in FIG. 3, whereby the machine operates with a relative lateral offset such that it lies outside the tractor's tracks.

Small shoes 31 are provided for keeping the machine at a minimum level above the ground.

Of course, this invention should not be construed as being limited by the specific constructional features described and illustrated herein, since many modifications and variations may be brought thereto without departing from the spirit and scope of the invention.

Figure 7:
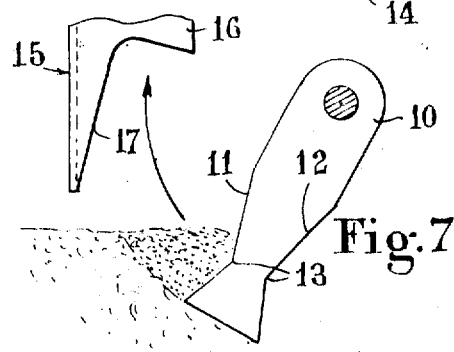
FIGS. 7, 8 and 9 are detail views showing the successive steps of the cutting of fibrous material between a flail and one tooth of the countercomb structure.
Figure 6:
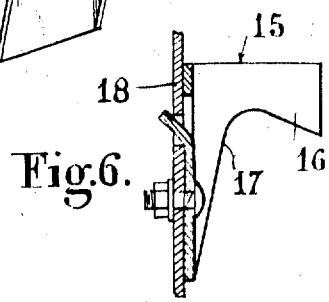
FIG. 6 is a vertical sectional view.
Figure 8:
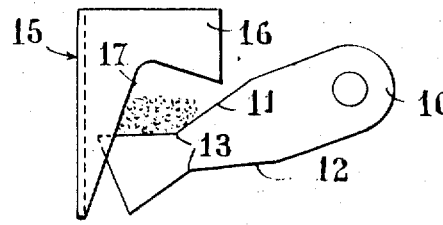
Figure 9:
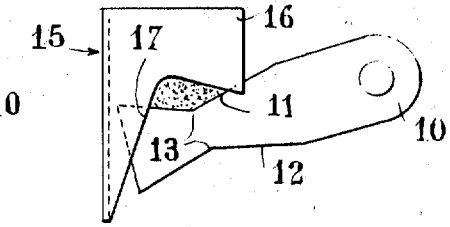

The essential feature characterizing this invention lies on the one hand in the specific shape of the pivoting flails and also of the fixed teeth of the countercomb, whereby the gathered straw or chaff blades can gradually and regularly be brought under the case 24, then pushed by the intermediate V-shaped portion of flails 10 and eventually cut thereby, and on the other hand in the V-shaped edges of the countercombs, as illustrated in FIGS. 7 to 9 of the drawing.

In this specific and exemplary form of embodiment, the rotor is driven preferably from the power takeoff of the tractor. This power takeoff is connected to a shaft 32 provided with universal joints and having its opposite end connected through a freewheel device to a gearbox 33 acting as a transfer case and having an output shaft provided with a pulley 34 driving in turn the driven pulley 35 by means of a transmission belt 36, as shown. Of course, other driving arrangements may be contemplated without departing from the basic principle of the invention.

Having thus described our invention, what we claim is:

1. In a mobile crop shredding machine having a frame structure, a rotor mounted on said frame structure for rotation with respect thereto and flail means pivotally mounted in axially spaced apart relation along said rotor, the improvement comprising: symmetrically disposed cutting edges on said flail means and stationary cutting means mounted on said frame structure in space apart relation, said stationary cutting means having spaced countercomb cutting edges cooperable with said flail cutting edges to form a cutting area, and said cutting edges on said flail means are spaced radially inwardly from the radial outer ends of the flails and comprise a pair of opposed V-shaped notches whose vertices converge toward each other to form reversible cutting edges on said flail means whereby, as said flail means rotates crop material is cut and shredded along the contour of said cutting area regardless of wear of the cutting edges.

2. An improved crop shredding machine, as recited in claim 1, wherein said cutting edges extend laterally from one side of said flail means.

3. An improved crop shredding machine, as recited in claim 1, wherein said stationary cutting means comprises generally U-shaped elements removably mounted on said frame structure, said U-shaped elements having outwardly extending spaced apart cutting edges and a bight portion connecting a base portion of said cutting edges, said bight portion being removably secured to said frame structure.

4. An improved crop shredding machine, as recited in claim 3, wherein said outwardly extending spaced apart cutting edges are disposed in planes parallel to planes formed by said flail means and said stationary cutting edges being further comprised of a notch extending laterally along a first inclined line extending upwardly from the base of said cutting edge, a second downwardly inclined line extending inwardly from an outer edge of said cutting edge and an interconnecting curved portion, the cutting edges of said flail means and of said stationary means cooperating to retain material raised by said flail means between the cutting edges of said stationary means and said flail means during the shredding operation.

5. A mobile crop shredding machine comprising, in combination:
 a frame structure;
 a rotor shaft rotatably mounted on said frame structure about a horizontally extending axis;
 a plurality of flail elements pivotally mounted in axially spaced apart relation along said shaft, said flail elements having laterally extending V-shaped cutting edges thereon; and
 stationary cutting means mounted in spaced apart relation on said frame structure, said stationary cutting means having pairs of laterally spaced apart countercomb cutting edges cooperable with cutting edges on said flail elements whereby crop material is cut and shredded between said V-shaped cutting edge of said flail elements and said countercomb cutting edges of said stationary cutting means.

6. A mobile crop shredding machine, as recited in claim 5, wherein a shoe member is disposed on said frame structure forwardly thereof, said shoe member having a downwardly inclined forward surface and said V-shaped cutting edges on said flail elements are symmetrically disposed in inverted relation with the vertices of said V-shaped portions converging whereby said flail elements are capable of being reversibly mounted on said rotor shaft.

7. A mobile crop shredding machine, as recited in claim 6, wherein said stationary cutting means are disposed to the rear of said inclined surface and comprise generally U-shaped members having a pair of outwardly extending leg portions having a base and an outer edge and a bight portion connecting said leg portions at the bases thereof, said leg portions being notched to form cutting edges and said bight portion being removably mounted on said frame structure.

8. A mobile crop shredding machine, as recited in claim 7, wherein said notched cutting edges are comprised of a first inclined line extending upwardly and outwardly from the base of said leg portion, a second inclined line extending upwardly and inwardly from said outer edge of said leg portion and a curved line connecting said first and second inclined lines, said notched cutting edges and said V-shaped cutting edges cooperating to form a closing quadrilateral as said flail element rotates whereby said crop material is cut and shredded along the contour of said quadrilateral.

9. A mobile crop shredding machine, as recited in claim 5, wherein said V-shaped cutting edges on said flail elements extend laterally from said element.

10. A mobile crop shredding machine comprising, in combination:
 a frame structure;
 a shoe member disposed forwardly on said frame structure, said shoe member having a downwardly inclined forward surface for exerting a downward force on crop material,
 a rotor shaft rotatably mounted on said frame structure about a horizontally extending axis;
 a plurality of flail elements pivotally mounted in axially spaced apart relation along said shaft, said flail elements having laterally extending V-shaped cutting edges thereon, and
 stationary cutting means mounted in spaced apart relation on said frame structure, said stationary means having notched cutting edges cooperable with the cutting edges on said flail elements whereby crop material is cut and shredded between said V-shaped cutting edge of said flail elements and said notched cutting edges of said stationary cutting means.

11. A mobile crop shredding machine comprising, in combination
 a frame structure,
 stationary cutting means mounted in transverse alignment on said frame structure and including vertically disposed, laterally spaced apart cutting edges;
 a rotor shaft rotatably mounted transversely within said frame structure for rotation about a horizontal axis and
 a plurality of flail elements pivotally mounted in axially spaced apart relationship along said rotor shaft and extending radially therefrom, each of said flail elements including a V-shaped portion vertically disposed with its V opening being in the rotational direction of said flail elements, said V-shaped flail portions having a width slightly less than the lateral space between adjacent cutting means, whereby the V-shaped portion of the flail elements cooperate with said cutting means by engaging crop material and lifting it upwardly through the cutting means, shredding the crop in the process.

12. A mobile crop shredding machine as recited in claim 11 wherein said stationary cutting means includes countercomb cutting edges cooperable with the V-shaped portions of said flail element for shredding crop material.

13. A mobile crop shredding machine as recited in claim 11 wherein each of said flail elements include a second V shaped portion orientated oppositely with respect to the other previously recited V-shaped portion, thereby making each flail element reversible.